US00RE44810E

(19) United States
(12) Reissued Patent
Kortum

(10) Patent Number: US RE44,810 E
(45) Date of Reissued Patent: Mar. 18, 2014

(54) SHAPED SNACKS MADE FROM BAKED DOUGH CRUMBS

(75) Inventor: Olaf Kortum, Neubiberg (DE)

(73) Assignee: Kraft Foods R&D, Inc., Deerfield, IL (US)

(21) Appl. No.: 13/402,653

(22) Filed: Feb. 22, 2012

Related U.S. Patent Documents

Reissue of:
(64) Patent No.: 7,597,917
Issued: Oct. 6, 2009
Appl. No.: 11/273,045
Filed: Nov. 14, 2005

(30) Foreign Application Priority Data

Nov. 17, 2004 (EP) ..... 04027247

(51) Int. Cl.
*A21D 13/00* (2006.01)

(52) U.S. Cl.
USPC ..... 426/138; 426/279; 426/283; 426/549; 426/391; 426/496; 426/512; 426/520

(58) Field of Classification Search
USPC ..... 426/138, 279, 283, 549, 391, 496, 512, 426/520
See application file for complete search history.

(56) References Cited

U.S. PATENT DOCUMENTS 3,393,074 A * 7/1968 Ehrlich ..... 426/94
4,650,685 A * 3/1987 Persson et al. ..... 426/285
6,153,239 A * 11/2000 Thiele et al. ..... 426/138
2003/0031761 A1* 2/2003 Kortum ..... 426/94
2003/0170348 A1* 9/2003 Mihalos et al. ..... 426/93
2004/0166219 A1* 8/2004 Justi ..... 426/549

FOREIGN PATENT DOCUMENTS

EP 576926 A2 * 1/1994
EP 1256280 A1 * 11/2002
GB 1510996 * 5/1978

* cited by examiner

*Primary Examiner* — Kelly Bekker
(74) *Attorney, Agent, or Firm* — Fitch, Even, Tabin & Flannery LLP

(57) ABSTRACT

The invention relates to a process for making shaped bread snacks comprising the steps of grinding baked dough material having a water activity of 0.85 to 0.99 into crumbs, optionally mixing the crumbs with small amounts of common food ingredients, heating the crumbs or the crumb mixture to a temperature in the range of about 70° C. to 80° C. and readjusting the water activity to about the value of the original baked dough material, hot moulding the crumbs or crumb mixture to a snack carrier of any desired shape, filling the snack carrier with a sweet, savory or any other filling, and packaging the obtained shaped bread snack and to the shaped bread snacks obtainable by this process.

12 Claims, 2 Drawing Sheets

Process
Shaped Snack made from Bread Crumbs

SHAPED SNACKS MADE FROM BAKED DOUGH CRUMBS

Matter enclosed in heavy brackets [ ] appears in the original patent but forms no part of this reissue specification; matter printed in italics indicates the additions made by reissue.

FIELD OF THE INVENTION

The present invention relates to a process for manufacturing shaped snacks from baked dough crumbs and to the snacks obtained thereby.

BACKGROUND OF THE INVENTION

There is a large variety of long-lasting bakery-type snacks with fillings on the market. The majority of these consist of dry cookie or dry biscuit-type dough as carrier combined with a fat-based filling. Beyond that there are also filled sponge-cake-type snacks or soft biscuit sandwiches, which are assembled with water or milk-containing fillings. These snacks have a higher moisture and are therefore of limited shelf life often requiring refrigerated or frozen storage conditions. The water activities (Aw) for these snacks range from Aw<0.6 for dry cookie-type sandwiches to around Aw 0.85 to 0.90 for the sponge-cake-type products.

Established processes for making baked goods carriers are basically applying bulk dough preparation and dough sheeting or depositing techniques. Desired shapes are cut out of the raw dough sheets and are freely baked like cookies, or the whole dough sheet is baked on a band oven. From this, a filled snack is created by laminating at least two baked sheets with a filling in-between followed by a cutting operation. In addition to many other processes which are too numerous to mention at this stage, baking in moulds is very common. A defined portion of raw dough is deposited into baking moulds to provide consistently shaped baked products after baking.

The dough recipes and mixing techniques provide the desired dough carrier texture. Most snack carrier dough recipes contain baking powders, and the preparation involves aeration steps during mixing or fat-layer lamination techniques in combination with a controlled baking process. Snack carriers with defined constant shapes are preferably made by using moulds, which help to control the dough shape during baking. Available dough carriers with a cavity made according to this process are fairly dry in taste and have relatively high fat and sugar contents. Their main application is for sweet chocolate snack assembling. There is no indication in literature or from industry that even shaped snack carriers with a cavity are being made or have been attempted by using a yeast or rye bread dough. The major problem in providing yeast dough-based snack carriers with a cavity is the fact that the rise of the dough in the mould is difficult to control.

Shaped fresh-baked loaves of bread are commonly offered in sizes around 0.5 to 1 kg. They are yeast-dough based and deliver a high ratio of crumb versus crust when baked in moulds or casings. The water activities (Aw) of fresh-baked toast bread would be around 0.94 to 0.96 and of fresh rye bread around 0.95 to 0.98. Attempts to create small 20 to 30 g snack carriers with a cavity using white or rye bread dough via mould baking provided a dry and crusty product with a low crumb content and therefore having a water activity of Aw<0.9. Resulting products were significantly different in taste and texture to bulk-baked white, rye or brioche-type bread.

Fresh-baked bread loaves have water activities around Aw=0.94 to 0.97. They are very suitable for the creation of snacks with a short shelf life when combined with moist fillings such as cheese or sausage (Aw=0.96 to 0.99). Accordingly, filled sandwiches made from sliced bread last only about 3 to 6 days. Providing a cheese-filled snack with the use of drier dough carriers (e.g. Aw<0.85) would lead to a significant moisture migration from the cheese into the dough with major impact on the overall quality and shelf life. This is especially the case when using biscuit-type carriers baked in moulds because their water activity tends to be lower (Aw<0.8). Bulk-baked fresh biscuit dough sheets provide an Aw=0.88 to 0.92 and available filled sandwich-type products deliver a much fresher taste when fillings have around the same water activity. From this aspect it is considered very advantageous if a small handheld individually-shaped and appealing dough carrier could be delivered at Aw=0.90 to 0.92 without undergoing the known dough sheeting and cutting process. It would be even more advantageous if this snack were lower in dietary calories than snacks available on the market. This could be achieved by using yeast dough instead of-biscuit-based carriers with moist fillings because yeast dough has overall lower fat and sugar contents.

EP 1,256,280 describes a process for making bread snacks with fillings of high water content and shelf lives at chilled or ambient temperatures of more than six weeks, wherein ground baked bread is used as raw material. The process is described as being especially useful for rye bread and involves the following steps:

(i) the baked bread is ground, (ii) water is added to the ground bread to improve its extrudability and to adjust its water activity to about 0.95 to 0.98 or higher, (iii) the bread/water mixture is kneaded to a bread dough, (iv) the bread dough is coextruded with the filling and (v) the snacks are formed, packed and pasteurized.

In this known process, the snack shape is created via a continuous pressure-forming process through a nozzle, where a filling is simultaneously inserted into the dough carrier (co-extrusion). The equipment proposed for this is a Rheon KN 400 extruder, which applies relatively low extrusion pressures. The provided products are fully enrobed (closed) filled snacks. Because of this closed snack system, it is therefore possible to pasteurize the complete product, which is recommended and required to reduce eventual yeast or mould contamination especially when, as claimed, delivering long-lasting quality. The patented process works most preferably with moist rye bread (Aw=0.95-0.98).

A disadvantage of low extrusion pressure originating in a Rheon is that it is very difficult to push through drier crumbs e.g. derived from white bread with water activities at 0.94 to 0.96, especially when no glycerin is added to the crumbs. Glycerin acts as a means of balancing water activity and moisture but it can give an unpleasant taste to the bread. It would be beneficial to prevent the use of glycerin in dough-enrobed snacks. Experimental trials with white bread crumbs without glycerin and no added water resulted in clogging of the Rheon extruder especially after stop/start operations. Any casing created was not stable enough to hold the filling because the crumbs did not stick together. Further trials with a higher shear extruder such as a Bosch WEF 1050 using dry white bread or rye bread or even biscuit type crumbs have shown that it was feasible to form a stable doughy casing but the dough texture lost its original structure completely. The product would be unacceptable to a consumer. The limitations of the approach indicated in EP 1,256,280 are that the products provided are fully enrobed snacks, which means that the filling of the snack is not visible to the consumer and white bread-type snacks are only feasible by adding significant amounts of unpleasant-tasting glycerin.

The problem underlying the present invention is to provide a process with which it is possible to manufacture shelf-stable snacks from all different types of bread with a visible filling and without glycerin addition.

SUMMARY OF THE INVENTION

The problem is solved by a process for making shaped bread snacks comprising the steps of:

- grinding baked dough material having a water activity of 0.85 to 0.99 into crumbs,
- optionally mixing the crumbs with small amounts of common food ingredients,
- heating the crumbs or the crumb mixture to a temperature in the range of about 70° to 80° C. and readjusting the water activity to about the value of the original baked dough material,
- hot moulding the crumbs or the crumb mixture to a snack carrier of any desired shape,
- filling the snack carrier with a sweet, savory or any other filling, and
- packaging the obtained shaped bread snack.

The present invention also relates to the snacks obtainable by this process.

DETAILED DESCRIPTION OF THE INVENTION

The present invention is based on the finding that baked bread crumbs having a water activity of 0.85 to 0.99, preferably 0.90 to 0.95 and being derived from yeast-based dough can be used to manufacture shaped snacks by a moulding process. Most lo stable snack carriers can be formed by this process if the crumbs are heated to a temperature of about 70° C. to about 80° C. and the water activity is readjusted depending on the type of bread, and the hot crumbs are pressed with a certain pressure into the moulds. Depending on the mould layout, any shaped is filled snack can be created when combined with a filling after moulding and packaging the complete product.

This finding is most surprising in view of the extrusion process of EP 1,256,280 which is predominantly useful for rye bread and in view of the fact that the moulding process does not lead to the desired results if it is conducted at room temperature or at slightly elevated temperatures. Heating of the crumbs and hot moulding is essential to the present invention.

Figure 1:
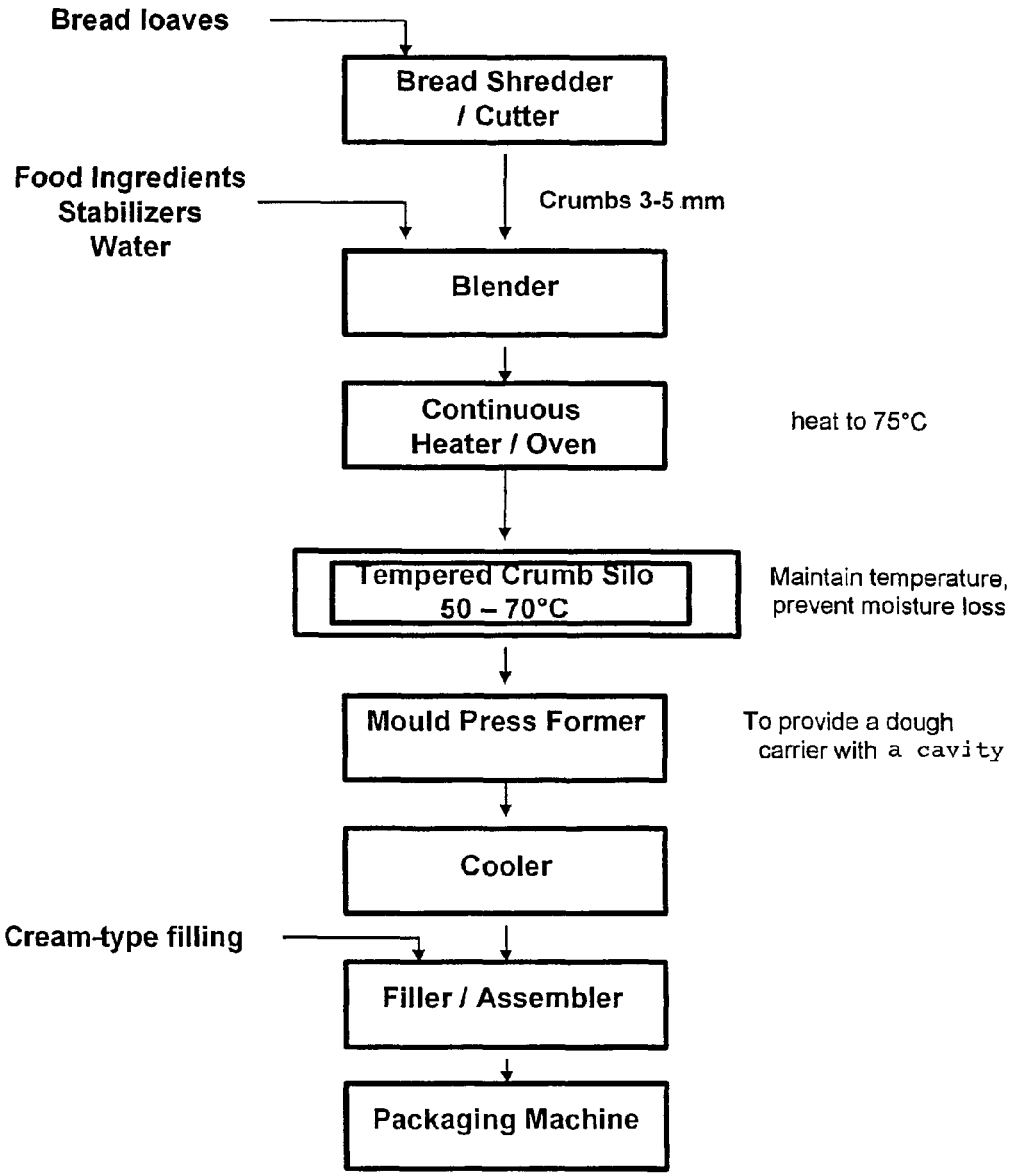
FIG. 1 is a flow chart of a preferred embodiment of the process of the present invention.

A preferred embodiment of the process of this invention is illustrated in the flow chart of FIG. 1.

The raw material for the process of the present invention can be any type of baked dough material, such as cake, biscuits, bulked-baked bread, especially rye bread, white bread, toast, brioches, rolls, etc. The baked dough material is preferably yeast-based.

The first step of the process of the present invention involves shredding of the baked dough or bread material, which can be done by a rotating knife cutter or high shear mixer, such as a Stephan cutter or continuous cutters such as a Hommel bread dicer.

The obtained crumbs which have dimensions in the range of preferably about 3 to 5 mm are then preferably mixed with small amounts of common food ingredients. To improve the processability of the dough blend made from crumbs and water, the addition of protein powder is recommended in a range of 0 to about 5 weight-%, most perferably about 2 to 3 weight-%. Any protein can be used which provides good sticking properties when moisturized and which coagulates upon being heat-treated. This could be animal, microbial or vegetable protein powders. Cereal proteins such as gluten are preferable but albumen protein is most preferable. It helps to increase the dough sticking properties necessary for good formability but most important it provides the desired firmness of the rye dough when an increased amount of water has been added to raise the water activity. Further ingredients investigated for supporting dough firmness rebuild were starch or other hydrocolloids. Any starch, such as inst. rice starch, or hydrocolloid is suitable for firming up the dough, but blends of native starches with maltodextrins, in particular a blend of a native waxy corn starch with dextrin, were found to be most appropriate with regard to simultaneously providing very good sticking properties. Especially preferred are cold-swelling starches of various origins like maize, potato, rice, tapioca, wheat, preferably in combination with stabilizers. It helps to increase dough sticking during pressing and later on to give the snack carrier shape a long shelf life without significant impact on taste. Other additives are for example inst. egg white, butter, glucose, flavors, etc.

The crumbs or crumb mixture is then heated directly or indirectly to a temperature in the range of about 70° C. to about 80° C., preferably to a temperature of around 75° C. The heating is preferably done by crumb exposure to hot air or infrared heat. Heating should be done as quickly as possible and immediately after this the hot crumbs mixture should enter a closed container to maintain moisture. Any moisture loss upon heating need to be considered and re-balanced in the recipe by adding extra water prior to or after heating, with the aim of keeping the original water activity of the fresh bread. The temperature of the crumbs in the storage container needs to be between 50 to 70° C.

Before or after heating, the moisture and consequently the water activity of the crumbs or the crumb mixture is adjusted depending on the baked dough or bread material which has been used as raw material. This is effected by the addition of a defined amount of water and optionally a lower amount of glycerin. Control of moisture loss and setting of a target water activity is critical to obtain the desired texture.

The water activity is defined as follows:

$$Aw = \frac{P}{Po},$$

wherein

P=partial pressure of water in the food product at temperature T,

Po=saturated water pressure of pure water at the given temperature T.

Water activity should be kept close to original bread in all cases and the fillings should match the Aw of the bread carrier.

Figure 2:
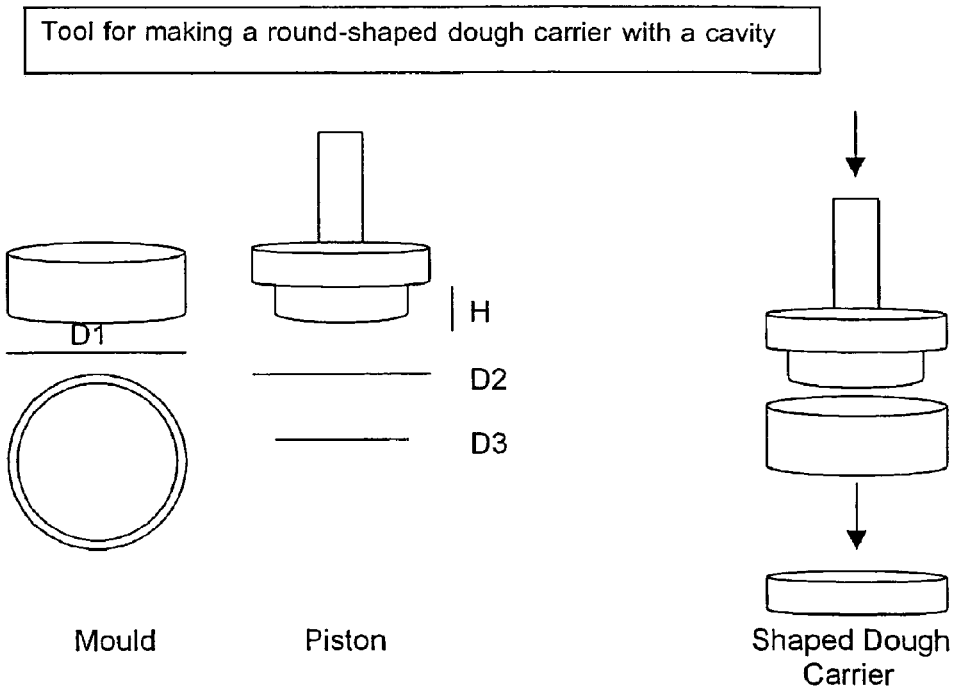
FIG. 2 illustrates a useful tool for making a round-shaped dough carrier with a cavity.

The hot crumbs or crumb mixture are then dosed at defined portions into moulds of any desired shape which can be round, oval, rectangular, square, etc. A specifically designed male form or piston presses the warm crumbs or crumb mixture with a defined static pressure of about 4 to about 8 bar, preferably 5 to 6 bar, for a short period of time of about 1 to about 5 sec, preferably about 2 to about 3 sec. Mould and piston can be at any temperature between about room temperature and about 70° C. Any commercially available moulding apparatus can be used for this purpose provided that moulds and pistons can be adapted to the present purposes. A useful tool for making a round-shaped dough carrier with a cavity is shown in FIG. 2.

Exemplary dimensions are:

mould inside diameter D1=56.6 cm, piston outside diameter D2=56.0 mm piston inside diameter D3=46.0 mm (to create a carrier rim of 5 mm thickness)

carrier height H: 12 mm

The carriers produced are released from the moulds and can be directly filled. The whole process can be fully automated. A possible layout for the machine and process is shown in FIG. 1. This machine can be further developed or integrated as a form, fill and seal operating unit, where the bread crumbs are directly pressed into preformed packaging (foil) moulds. The advantage is that the filled snacks exit the machine already hygienically packed.

There is no restriction with respect to the type of filling. Any known filling can be used. Preferably, the water activity of the fillings matches the water activity of the snack carrier.

As mentioned above, the present invention is especially useful for white bread which cannot be processed to acceptable bread snacks with the continuous extrusion process known from EP 1,256,280. The process of the present invention is also particularly useful for yeast-risen dough types like toast bread or sour-dough type bread which are not available on the market in the form of small snack carriers because the size of the desired cavity is difficult to control.

The obtained bread or dough quality of the carrier is similar to the original raw material. The process of the invention is very controllable and robust in design. The key to the invention is the use of hot pre-pasteurised crumbs with controlled water activity. It was surprisingly found that the use of hot crumbs and hot moulding of the crumbs enables bread carriers to be produced with excellent reconstitution properties of any shape and size. The texture of the dough baked carriers can be set by various means. The heat treatment of the crumbs and hot moulding process followed by the integrated filling step as a hot-fill or clean cold-fill operation also enables preservative-free snacks. Multi-component snacks can be created in various sizes including small bite sizes.

The invention will now be illustrated by specific examples which describe preferred embodiments of the present invention. They are not intended to limit the scope of the invention.

EXAMPLES

Example 1

Handheld Shaped Snack Based on White Bread and Cream Cheese

Ingredients are prepared according to Formula 1 below. Commercially available white sandwich toast bread (750 g sliced loaf) is filled into a small knife shredder (Thermomixer/Company: Vorwerk) and cut in a 2×5 seconds' interval run into 2 to 5 mm crumbs. The water activity of these crumbs is about Aw=0.95. The crumbs are transferred into a bowl and mixed manually by spoon with molten butter (to enhance taste) and the dry components (to stabilize the carrier after pressing).

Formula 1

| Ingredients | % | g |
|---|---|---|
| White Toast Bread (Aw = 0.95) | 88.5 | 354 |
| Butter | 5 | 20 |
| Instant modified starch | 4 | 16 |
| Maltodextrin | 2 | 8 |
| Guar gum | 0.2 | 0.8 |
| Lacost bean gum | 0.2 | 0.8 |
| Potassium sorbate | 0.1 | 0.4 |
| Total | 100 | 400 |
| Water (balance after heat) | 5-15 | 20-60 |

A defined amount of this breadcrumb mix is evenly spread out on a standard oven plate. The filled plate is put in a conventional kitchen oven. The temperature is set to about 300° C. to ensure rapid heating. The temperature change of the crumb mix is checked after 1 min by also slightly stirring the mix on the plate. The crumb mix reaches 75° C. after 2 to 3 min and the plate is taken out of the oven and put on a scales. To compensate the encountered water loss (about 5 to 15% depending on heating conditions and surface exposure) the weight is readjusted by spraying sterile water evenly spread onto the crumb surface.

The hot mix (50 to 60° C.) is transferred into an insulated storage bowl and sealed until use. 25 g of this crumb mix is put into e.g. a ring mould model as show in FIG. 2. To form shaped white bread carriers the piston is pressed down with 5 bar using a leveraged power press for 3 to 5 sec. Afterwards the carriers are pushed manually out of the mould and released from the piston. To prevent sticking it was found advantageous to use a Teflon-coated piston.

The carrier can be cooled in a fridge to assist firming-up. The cavity of the carrier is filled with water-activity-reduced (Aw=0.96) cream cheese to create a snack. The snack is packed under a modified atmosphere (N2 gas flash) and will last several weeks under refrigerated conditions.

Example 2

Shaped Snack Made from Rye Bread with Cheddar Cheese

The preparation process described in example 1 is also used for example 2. Formula 2 is based on commercially available packed rye bread (500 g).

Formula 2

| Ingredients | % | g |
|---|---|---|
| Rye bread (Aw = 0.96) | 87.1 | 348.4 |
| Butter | 5 | 20 |
| Instant modified starch | 4 | 16 |
| Maltodextrin | 3 | 12 |
| Instant egg white powder | 0.8 | 3.2 |
| Potassium sorbate | 0.1 | 0.4 |
| Total | 100 | 400 |
| Water (balance after heat) | 5-15 | 20-60 |

Rye bread crumb mix heating takes about 3 to 4 min at 300° C. Water loss adjustment is around 6% post heating. Pressing is conducted at about 6 bar for 3 to 5 sec. using the leveraged power press. The created round carrier is filled with a cheddar process cheese spread (Aw=0.97) to deliver a tasty snack.

Example 3

Sweet Brioche Type Snack with Milk Cream Filling

Apply the same preparation process as in the above examples following Formula 3.

Formula 3

| Ingredients | % | g |
|---|---|---|
| Sweet milk buns (brioche type bread (Aw = 0.90) | 88.1 | 352.4 |
| Butter | 5 | 20 |
| Instant modified starch | 3 | 12 |
| Sugar | 2 | 8 |
| Instant egg white powder | 1.8 | 7.2 |
| Potassium sorbate | 0.1 | 0.4 |
| Total | 100 | 400 |
| Water (balance after heat) | 5 | 20 |

Milk-buns breadcrumb-mix heating takes about 2 to 3 min at 300° C. Water loss adjustment is around 5% after heating. Pressing is carried out at about 6 bar for 3 to 5 sec. using the leveraged power press. The created round carrier is filled with an aerated milk cream or milk chocolate cream (Aw=0.90) to produce a sweet.

The invention claimed is:

1. A process for making shaped bread snacks, said process comprising the steps of:

(1) grinding a baked dough material into crumbs, wherein the baked dough material has a water activity of 0.85 to 0.99;

(2) optionally mixing the crumbs with food ingredients to form a crumb mixture;

(3) heating the crumbs of step (1) or the crumb mixture of step (2) to a temperature in the range of about 70° C. about 80° C. and readjusting the water activity to about the value of the baked dough material used in step (1);

(4) hot moulding the crumbs or crumb mixture of step (3) using a static pressure of about 4 to about 8 bar to form a snack carrier having a desired shape;

(5) filling the snack carrier with a filling to form the shaped bread snack; and (6) packaging the shaped bread snack.

2. The process according to claim 1, wherein the filling is a sweet or savory filling.

3. The process according to claim 1, wherein the crumbs or crumb mixture of step (3) are heated at about 75° C.

4. The process according to claim 1, wherein the water activity of the baked dough material in step (1) is about 0.90 to about 0.95.

5. The process according to claim 2, wherein the water activity of the baked dough material in step (1) is about 0.90 to about 0.95.

6. The process according to claim 1, wherein the baked dough material is yeast-based.

7. The process according to claim 2, wherein the baked dough material is yeast-based.

8. The process according to claim 1, wherein the static pressure is about 5 to about 6 bar.

9. The process according to claim 1, wherein the hot moulding in step (4) is carried out for a period of about 1 to about 5 seconds.

10. The process according to claim 8, wherein the hot moulding in step (4) is carried out for a period of about 1 to about 5 seconds.

11. The process according to claim 1, wherein the crumb mixture of step (2) is formed and the food ingredients are selected from the group consisting of proteins, starches, hydrocolloids, maltodextrin, egg whites, butter, glucose, flavours, and mixtures thereof.

12. The process according to claim 2, wherein the crumb mixture of step (2) is formed and the food ingredients are selected from the group consisting of proteins, starches, hydrocolloids, maltodextrin, egg whites, butter, glucose, flavours, and mixtures thereof.

* * * * *